(12) United States Patent
van Dijk

(10) Patent No.: US 10,785,066 B1
(45) Date of Patent: Sep. 22, 2020

(54) CAN COMMUNICATION WITH BROKEN CABLE

(71) Applicant: NXP B.V., Eindhoven (NL)

(72) Inventor: Lucas Pieter Lodewijk van Dijk, Kranenburg (DE)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/693,022

(22) Filed: Nov. 22, 2019

(51) Int. Cl.
*H04L 25/02* (2006.01)
*H04L 12/40* (2006.01)

(52) U.S. Cl.
CPC .... *H04L 25/0298* (2013.01); *H04L 12/40013* (2013.01); *H04L 12/40032* (2013.01); *H04L 25/0272* (2013.01); *H04L 25/0278* (2013.01); *H04L 2012/40215* (2013.01)

(58) Field of Classification Search
None
See application file for complete search history.

(56) References Cited

U.S. PATENT DOCUMENTS

| | | | |
|---|---|---|---|
| 6,326,817 B1* | 12/2001 | Boezen | H03F 3/45704 327/90 |
| 7,888,969 B2* | 2/2011 | Metzner | H04B 3/06 326/86 |
| 9,606,948 B2* | 3/2017 | Monroe | G06F 13/4072 |
| 9,685,936 B2* | 6/2017 | Chang | H03K 5/003 |
| 9,965,426 B2* | 5/2018 | Pihet | G06F 13/4027 |
| 2012/0051241 A1* | 3/2012 | Mori et al. | H04L 12/40039 370/252 |
| 2014/0056388 A1* | 2/2014 | Mori | H04B 1/10 375/340 |
| 2015/0029626 A1* | 1/2015 | Yang | H04L 43/08 361/57 |
| 2016/0196230 A1* | 7/2016 | Pihet | G06F 13/4027 710/314 |

* cited by examiner

*Primary Examiner* — Crystal L Hammond
(74) *Attorney, Agent, or Firm* — Rajeev Madnawat

(57) ABSTRACT

A circuit for generating a bias voltage for a terminating end capacitor in a controller area network (CAN) bus having a CANH and a CANL terminals is disclosed. The circuit includes a configurable voltage source, a controller to generate a control signal to operate the configurable voltage source, a CANH error detector and a CANL error detector. The CANH error detector and the CANL error detector are configured to provide inputs to the controller. The controller is configured to generate the control signal based on the outputs of the CANH error detector and the CANL error detector. The configurable voltage source is configured to output a bias voltage based on the control signal.

20 Claims, 5 Drawing Sheets

CAN COMMUNICATION WITH BROKEN CABLE

BACKGROUND

A Controller Area Network (CAN bus) is a vehicle bus standard designed to allow microcontrollers and devices to communicate with each others' applications without a host computer. It is a message-based protocol, designed originally for multiplex electrical wiring within automobiles to save on copper, but can also be used in many other contexts. For each device the data in a packet is transmitted sequentially but in such a way that if more than one device transmits at the same time the highest priority device is able to continue while the others back off. Packets are received by all devices, including by the transmitting device. The CAN bus uses a twisted wire pair in which one wire is CANH and the other CANL. For one reason or another, these wires may not be property soldered and may show intermittent open that can cause bit errors and may cause an interruption in data communication.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a circuit for generating a bias voltage for a terminating end capacitor in a controller area network (CAN) bus having a CANH and a CANL terminals is disclosed. The circuit includes a configurable voltage source, a controller to generate control signals to operate the configurable voltage source, a CANH error detector and a CANL error detector. The CANH error detector and the CANL error detector are configured to provide inputs to the controller. The controller is configured to generate control signals based on the outputs of the CANH error detector and the CANL error detector. The configurable voltage source is configured to output a bias voltage based on the control signal.

In some examples, the circuit for generating a bias voltage includes a plurality of level shifter circuits between the CANH error detector/the CANL error detector and the controller to change a voltage domain of the output of the CANH error detector. In some examples, the CANH error detector includes a first comparator, a first resistor and a second resistor, wherein the comparator is connected across the second resistor and an end of the first resistor is connected to the CANH terminal. Similarly, the CANL error detector includes a first comparator, a first resistor and a second resistor, wherein the comparator is connected across the second resistor and an end of the first resistor is connected to the CANL terminal.

In one embodiment, the configurable voltage source includes a first set of resistors coupled with a first switch and a second set of resistors coupled with a second switch. The first and the second switches are operable by the controller based on the outputs of the CANH error detector and the CANL error detector.

In a different embodiment, the configurable voltage source further includes a comparator coupled with a reference voltage source and a switch operable by the output of the comparator. The comparator is connected to a reference voltage source. The first switch and the second switch are configured to bypass one or more of the plurality of resistors based on the control signal from the controller.

The configurable voltage source is configured to be coupled with a terminal of the terminating end capacitor.

In another embodiment, a method for generating a bias voltage for a terminating end capacitor in a controller area network (CAN) bus having a CANH wire and a CANL wire is disclosed. The method includes detecting an error condition in the CAN bus, generating a bias voltage based on the error condition and applying the bias voltage to a terminal of the terminating end capacitor. The error condition includes an intermittent open in the CANH wire or in the CANL wire. The generating includes receiving a control signal from a controller based on the detecting the error condition. The bias voltage is 1V or 4V depending on the error condition.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
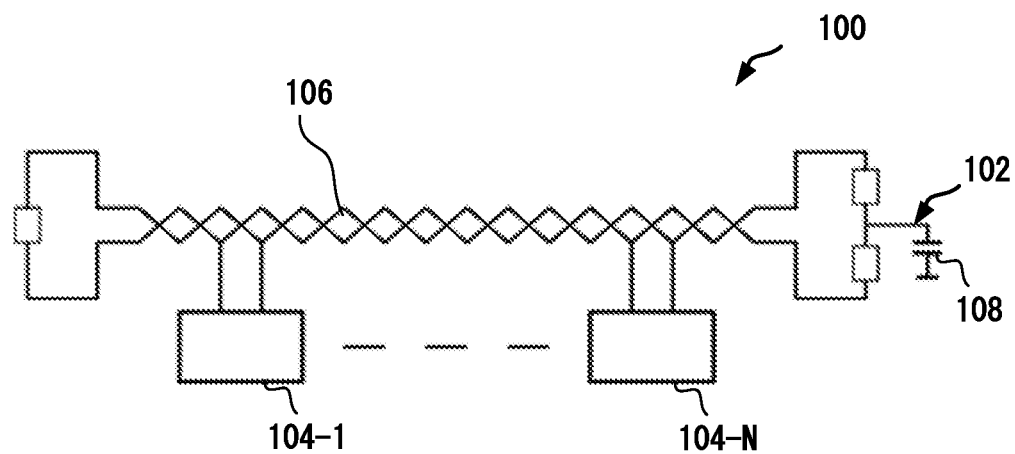
FIG. 1 depicts a controller area network (CAN) bus with a terminating end capacitor in accordance with one or more embodiments of the present disclosure.

Note that figures are not drawn to scale. Not all components in the chip are shown. The omitted components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

FIG. 1 depicts a controller area network (CAN) bus 100 with a terminating end capacitor 108. The CAN bus 100 includes a twisted wire pair 106. The twisted wire pair 106 includes CANH and CANL wires. The CAN bus 100 may include one or more communication nodes 104-1 . . . 104-N. The capacitor 108 is typically 4.7 nF. The value of the capacitor 108 may be increased to approximately 100 nF. By increasing the value of the capacitor 108, a signal voltage at CANL or CANH during intermittent opens is improved. However, the improvement in the signal voltage is not sufficient to have a reliable communication during intermittent opens. The resistors coupled with the capacitor 108 are typically 60 ohm each.

As shown, the communication nodes (ECUs) 104-1 . . . 104-N are connected via an unshielded twisted pair 106. Termination is implemented at the far left- and right-hand side of the CAN bus 100. There are two options, either by using a single resistor as shown in the left-hand side of the CAN bus 100, or via two resistors and the capacitor 108, referred to as "split-termination" as shown on the right-hand side of the CAN bus 100. The latter method is commonly used as it offers an additional low-pass filtering to improve EMC performance.

Figure 2:
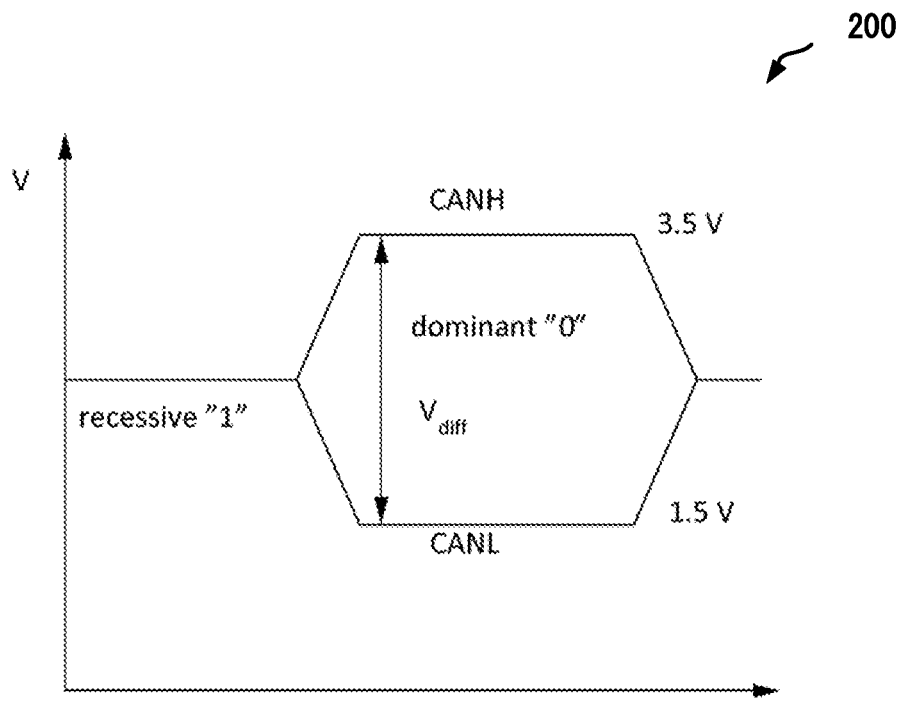
FIG. 2 depicts CAN bus communication protocol showing a representation of "0" and "1" based on a differential voltage at CANH and CANL.

As shown in FIG. 2, in normal operation (when no errors are present) the CAN bus 100 signals CANH and CANL are driven such that a differential voltage is generated (to send a dominant signal) or no differential signal is generated (to send a recessive bit). For a dominant bit ("0") the voltage at CANL is approximately 1.5V and the voltage at CANH is 3.5V and Vdiff represents a difference between the voltages at CANH and CANL.

In some examples, the following error conditions may cause disruption in the communication on the CAN bus 100.
1. Open wire on CANH or CANL
2. Intermittent open wire on CANH or CANL
3. Open connection contact at CANH or CANL
4. Intermittent open connection contact at CANH or CANL
5. Open Solder joint contact at CANH or CANL
6. Intermittent open solder joint contact at CANH or CANL
7. Open Solder joint contact at TXDL or RXDL at microcontroller
8. Intermittent open Solder joint contact at TXDL or RXDL at microcontroller
9. Open Solder joint contact at TXDL or RXDL at transceiver
10. Intermittent open Solder joint contact at TXDL or RXDL at transceiver
11. When a common-mode choke is used, there are also associated errors possible with that (e.g. solder joint related).

Figure 3:
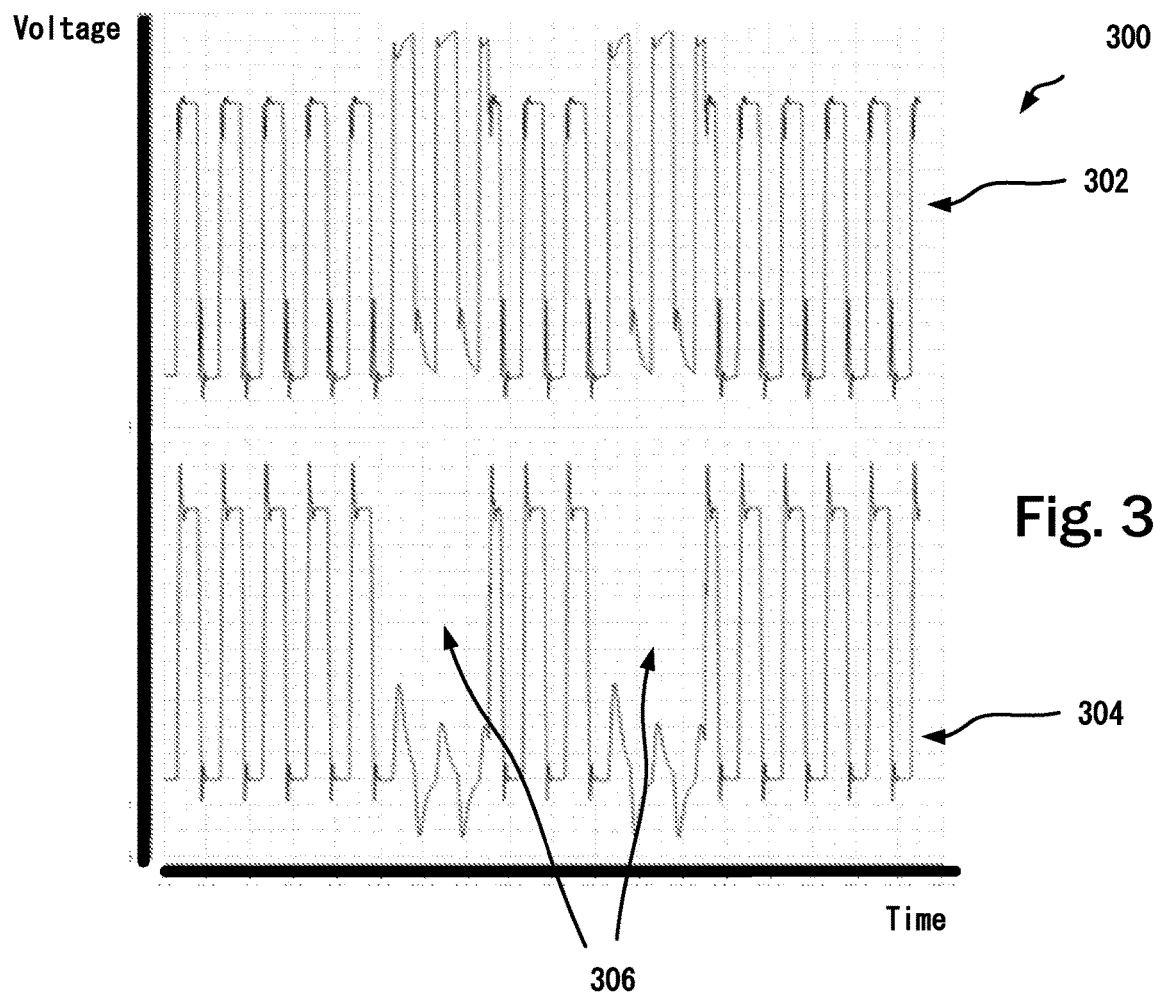
FIG. 3 shows a graph of differential voltages of CANL and CANH during an open CANH wire followed by an open CANL wire.

FIG. 3 shows a graph 300 to demonstrates the effect of broken or lose wires. The simulation result shows the effect of an open connection in the CANH connection between 10 μs and 15 μs as well as an open connection in the CANL connection between 20 μs and 25 μs. The trace 302 shows the differential signal at the node 104-1, while the trace 304 shows the differential bus signal at the node 104-N. The graph area 306 shows the condition of the signal transmission when there is an open connection during a time period. As shown, the signals at the node 104-N do not allow proper communication anymore on the occurrence of any of the cable interruptions nor do these signals comply with the ISO11898-2 standard.

A typical solution that uses a larger capacitor 108 has drawbacks. The bitrate is limited to 125 kbit/s. The solution needs external 511Ω (connected between RtL-pin of a CAN transceiver and CANL and between the RtH-pin of the CAN transceiver and CANH) at the terminating end. This solution does not allow for the "standardized" CAN transceiver pinout. The internal switches on RtH and RtL pins need to be implemented with high-voltage transistors such that the typical solution will require larger area on the silicon wafer for the CAN transceiver. Note that CAN transceivers are parts of the nodes 104-1 . . . 104-N. A CAN transceiver (not shown) interfaces between a CAN protocol controller (not shown) and the physical wires 106 of the CAN bus 100. CAN transceivers and CAN protocol controller is well known in the art.

Figure 4:
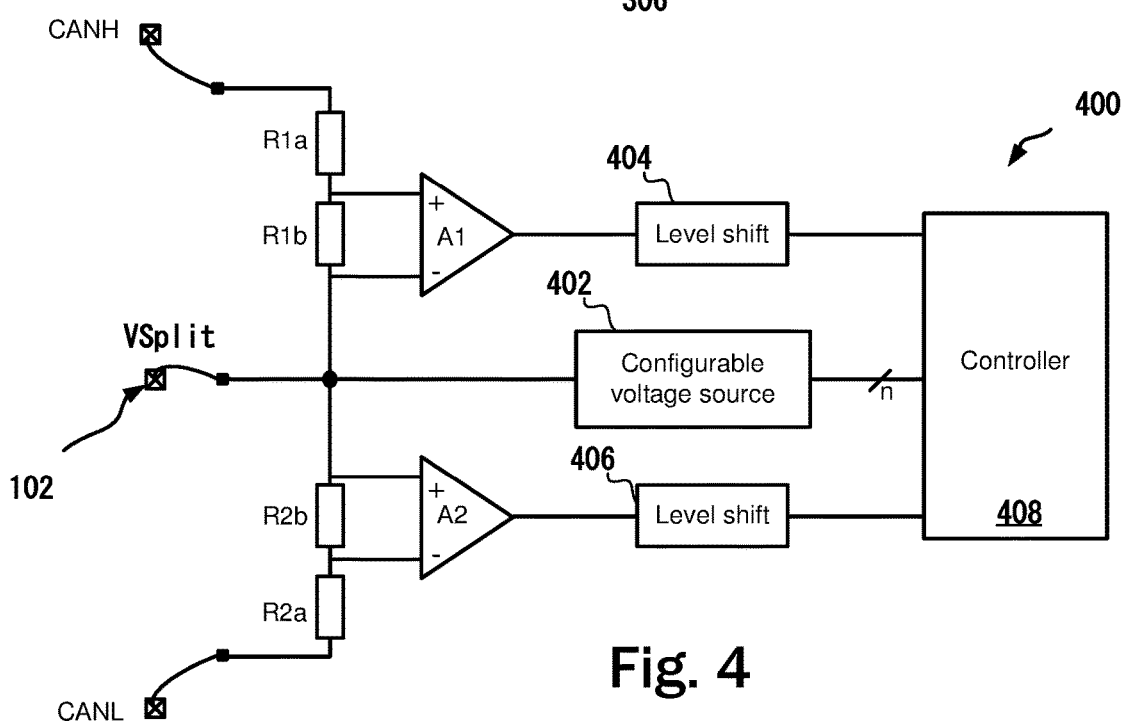
FIG. 4 shows a schematic of a circuit for adjusting a voltage at the terminating capacitor of CAN bus in accordance with one or more embodiments of the present disclosure.

FIG. 4 shows a sample implementation of a voltage adjustment circuit 400 for generating a capacitor 108 bias voltage to overcome error conditions on CANH or CANL. The voltage adjustment circuit 400 includes a resistor R1$a$ coupled to CANH and a resistor R1$b$. The resistors R1$a$ and R1$b$ are coupled with a comparator A1. An optional level shifter 404 may be included to change the voltage domain of the voltage at the output of the comparator A1. The voltage adjustment circuit 400 further includes resistors R2$b$ and R2$a$ that are coupled with a comparator A2. An optional level shifter 406 may be included to change the voltage domain of the voltage at the output of the comparator A2. A configurable voltage source 402 is included to adjust the voltage at the terminal of the capacitor 108.

In some implementations, the resistors R1$a$, R1$b$, R2$a$, R2$b$ may already be part of a CAN transceiver (a part of the node 104-1 and 104-N). The resistors R2$b$ and R1$b$ allow current sense in CANL and CANH branch respectively. The sensed current is converted via differential amplifiers A1 and A2 to a voltage. When the sensed current in the CANH branch (detected via the comparator A1) is zero but the sensed current in the CANL branch (detected via the comparator A2) is not zero, an open CANH connection is detected and the configurable voltage source 402 is configured to produce 4V. Similarly, when the sensed current in the CANL branch (detected via the comparator A2) is zero but the sensed current in the CANH branch (detected via the comparator A1) is not zero, an open CANL connection is detected and the configurable voltage source 402 is configured to produce 1V. In other cases the configurable voltage source 402 is biased to 2.5 V (Vcc/2 equivalent to half the supply voltage). A controller 408 is included to send control signals to the configurable voltage source 402 based on the sensed current in the CANH and CANL branches as described above.

Figure 5:
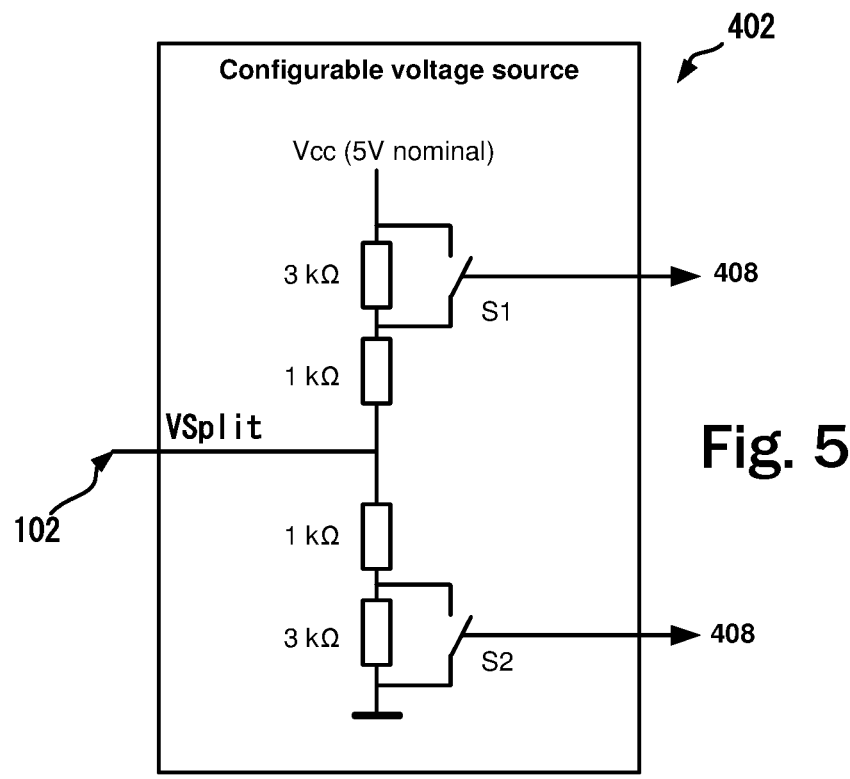
FIG. 5 shows a schematic of a circuit for generating a variable voltage at the terminating capacitor of CAN bus to overcome intermittent open CANH or CANL wire in accordance with one or more embodiments of the present disclosure.
Figure 6:
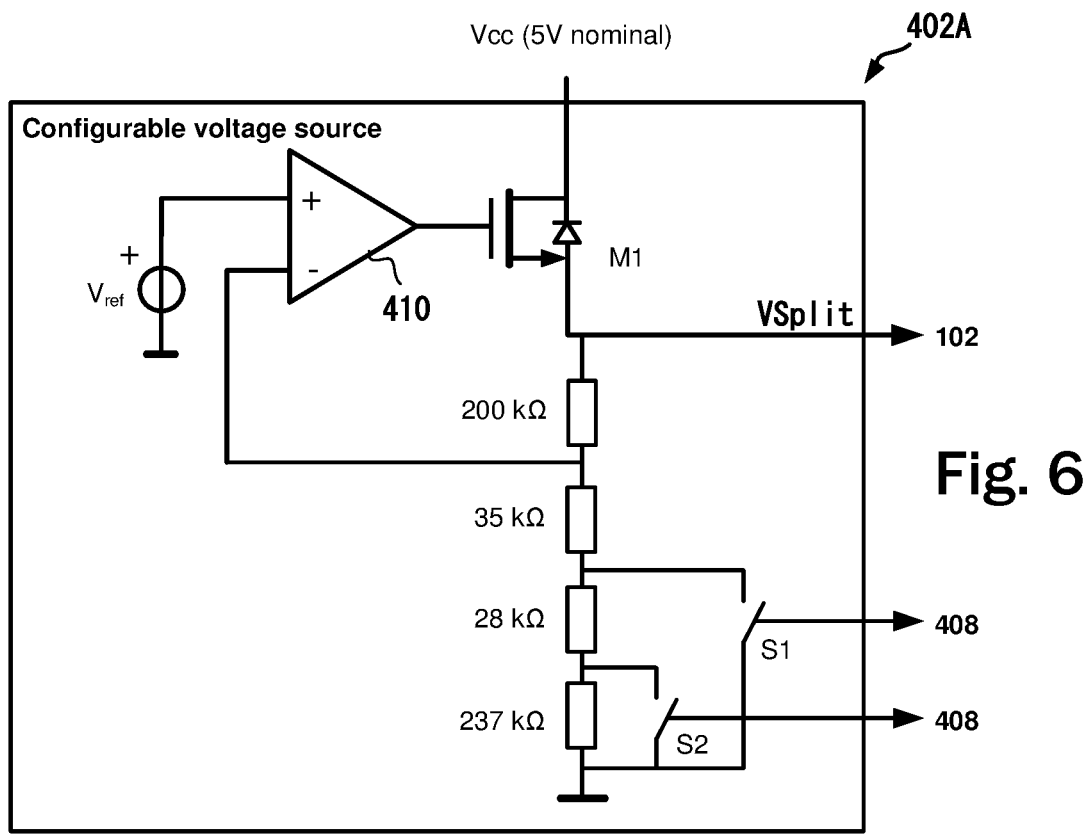
FIG. 6 shows a schematic of a circuit for generating a variable voltage to be applied at CANH or CANL to overcome intermittent open CANH or CANL wire in accordance with one or more embodiments of the present disclosure.

Various implementations are possible for the configurable voltage source 402. FIG. 5 and FIG. 6 show two such example implementations. FIG. 5 shows a configurable voltage source 402 using a resistive divider. When the switch S1 and the switch S2 are both opened, the split voltage VSplit (that is applied to the terminal 102 of the capacitor 108) is set to 2.5V (Vcc divided by two). When the switch S1 is closed (and the switch S2 opened) the split voltage VSplit is set to 4V and when the switch S2 is closed (and the switch S1 opened) the split voltage VSplit is set to 1V. The switches S1 and S2 are opened or closed based on a control signal from the controller 408.

FIG. 6 shows the configurable voltage source 402 in another embodiment 402A. In this embodiment, the configurable voltage source 402A includes a comparator 410 coupled with the reference voltage Vref and the comparator 410 is configured to drive a transistor M1. The switches S1 and S2 are controlled by a control signal from the controller 408.

Still referring to FIG. 6, the implementation 402A of the configurable voltage source 402 are based on a linear voltage regulator where the voltage feedback ladder is configured differently depending on the required nominal output voltage. The split voltage (VSplit) is set to 1V when both the switches S1 and S2 are opened. VSplit is set to 4 V when the switch S1 is closed and the switch S2 is opened. Vsplit can also be set to 2.5 V when the switch S2 is closed and the switch S1 is opened. It is noted that the reference voltage (Vref, equal to 0.6 V in the example embodiment) is a well-known Bandgap voltage reference but could alternatively be realized by a resistive divider connected to Vcc such that the output voltage would also track the supply voltage Vcc.

Figure 7:
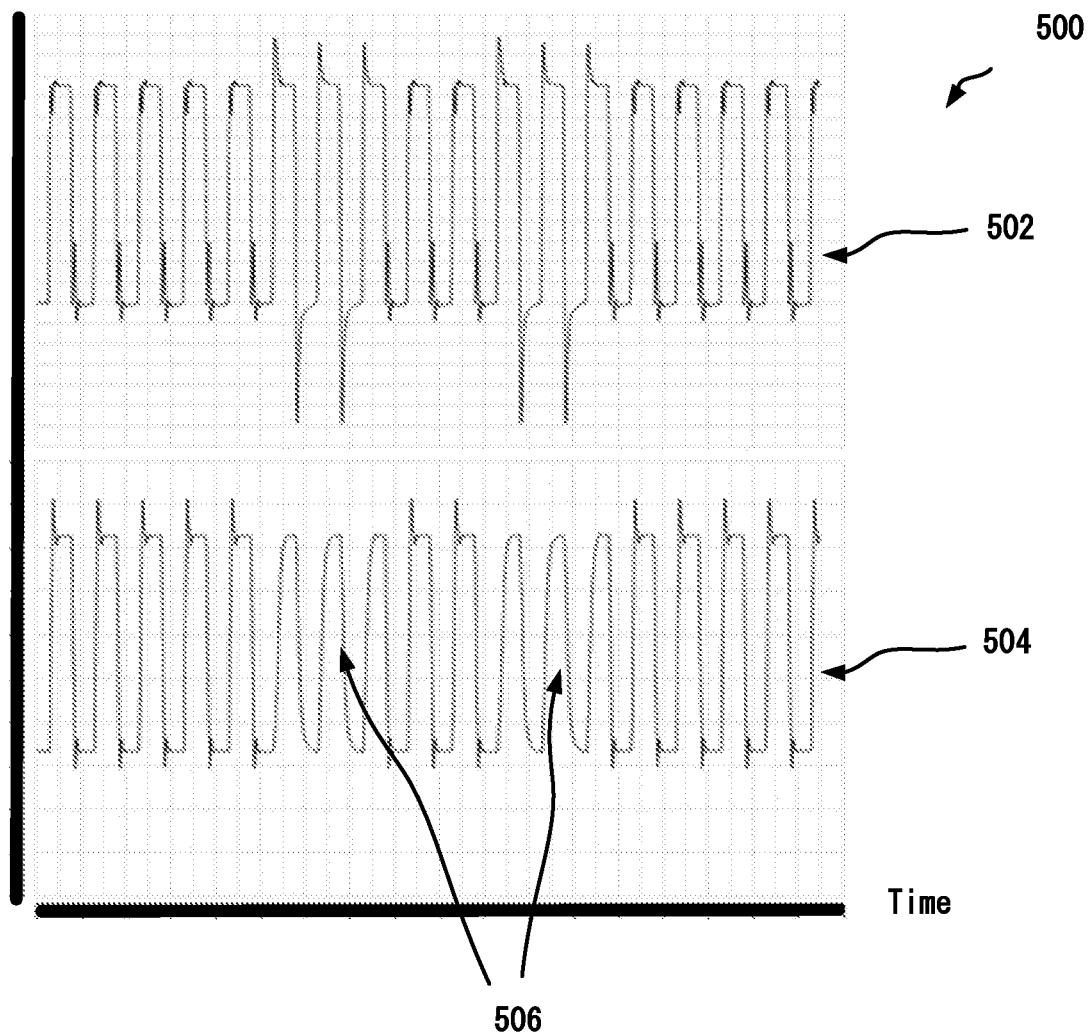
FIG. 7 shows a graph of differential voltages of CANL and CANH during an open CANH wire followed by an open CANL wire after voltage adjustment to overcome an open CANH or CANL.

FIG. 7 shows a graph 500 that includes a trace 502 of the differential voltage at CANH and CANL at the node 104-1 and a trace 504 of the differential voltage at CANH and CANL at the node 104-N. As shown in FIG. 3, an open connection is present on CANH between 10 μs and 15 μs followed by an open connection on CANL between 20 μs and 25 μs. A comparison of the graph 300 with the graph 500 shows that the voltage adjustment circuit 400 is able to adjust the differential voltage in the graph sections 506 that represents the duration in which there was an open wire.

Figure 8:
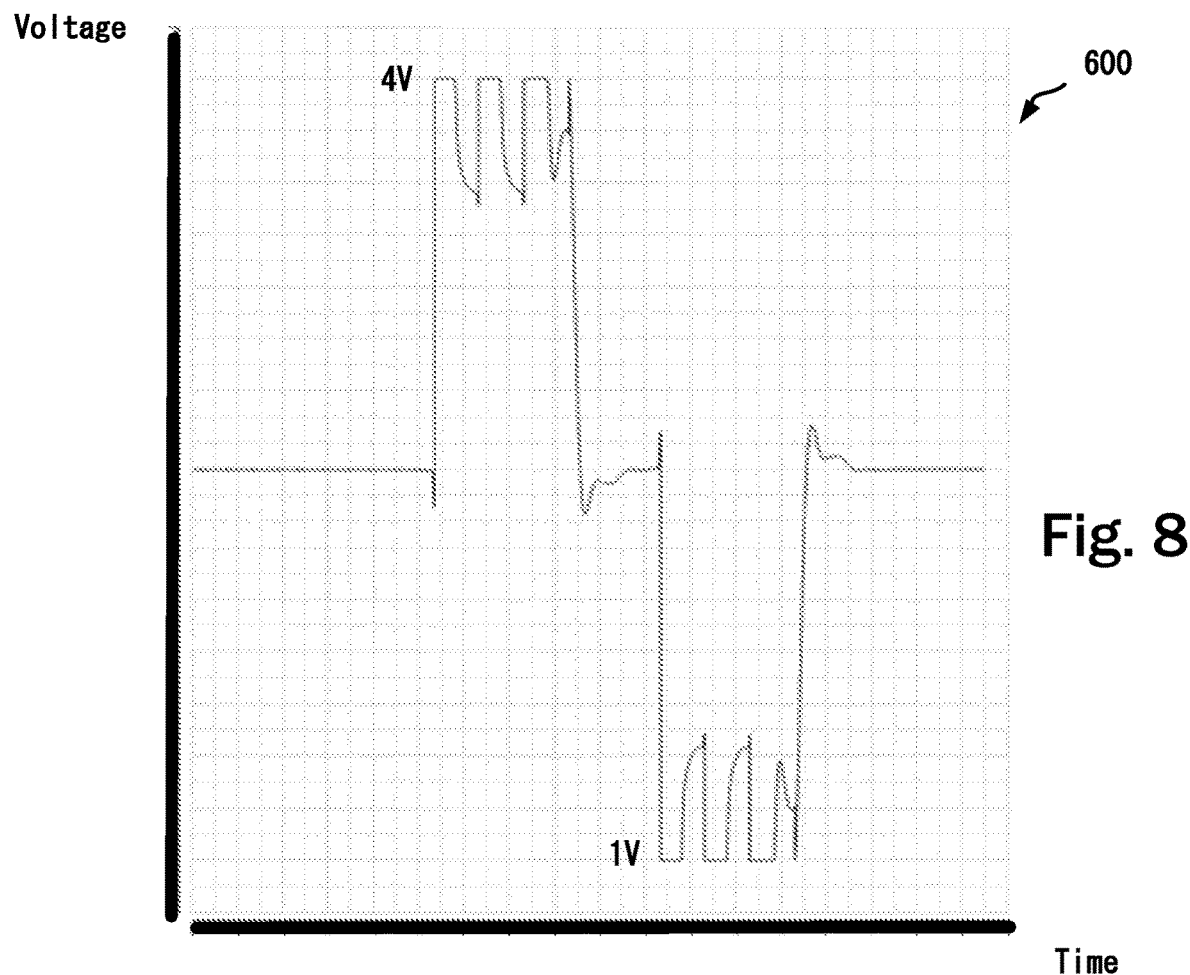
FIG. 8 depicts a graph of a voltage at the terminating capacitor of CAN bus in accordance with one or more embodiments of the present disclosure.

FIG. 8 shows the biasing voltage VSplit for the capacitor 108. The biasing voltage Vsplit is generated depending on the detected open wire. As discussed above, VSplit is increased to 4V upon detection of an (intermittent) open connection on CANH, while VSplit is decreased to 1V upon detection of an (intermittent) open connection on CANL.

Figure 9:
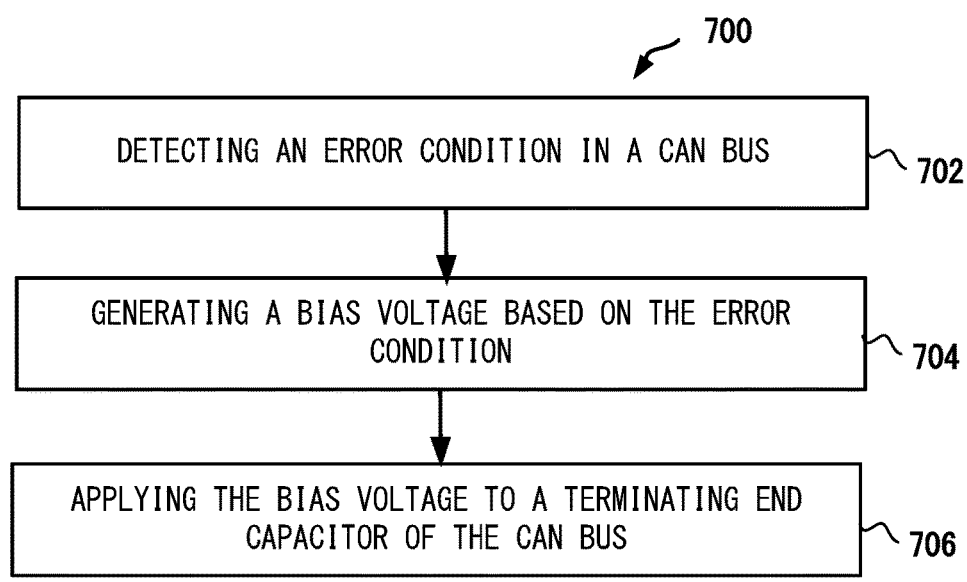
FIG. 9 shows a method for generating a bias voltage according to an error condition in accordance with one or more embodiments of the present disclosure.

FIG. 9 shows a method 700 for generating a bias voltage according to an error condition in a CAN bus having CANH and CANL wires. Accordingly, at step 702, an error is detected by an error detector that monitors the CANH and CANL wires for error conditions such as intermittent opens. At step 704, based on the detected error conditions, a bias voltage is generated by a configurable voltage source. The value of bias voltage depends on a control signal from a controller that receives the output of the error detection. At step 706, the generated bias voltage is applied to a terminal of a terminating end capacitor in the CAN bus.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A circuit for generating a bias voltage for a terminating end capacitor in a controller area network (CAN) bus having a CANH and a CANL wires, the circuit comprising:
   a configurable voltage source;
   a controller to generate a control signal to operate the configurable voltage source;
   a CANH error detector couple with the controller; and
   a CANL error detector coupled with the controller;
   wherein the controller is configured to generate the control signal based on the outputs of the CANH error detector and the CANL error detector, wherein the configurable voltage source is configured to output a bias voltage based on the control signal.

2. The circuit of claim 1, further including a level shifter circuit between the CANH error detector and the controller to change a voltage domain of the output of the CANH error detector.

3. The circuit of claim 1, wherein the CANH error detector includes a first comparator, a first resistor and a second resistor, wherein the comparator is connected across the second resistor and an end of the first resistor is connected to the CANH terminal.

4. The circuit of claim 1, wherein the CANL error detector includes a first comparator, a first resistor and a second resistor, wherein the comparator is connected across the second resistor and an end of the first resistor is connected to the CANL terminal.

5. The circuit of claim 1, further including a level shifter circuit between the CANL error detector and the controller to change a voltage domain of the output of the CANL error detector.

6. The circuit of claim 1, wherein the configurable voltage source includes a first set of resistors coupled with a first switch.

7. The circuit of claim 6, wherein the configurable voltage source includes a second set of resistors coupled with a second switch.

8. The circuit of claim 7, wherein the first switch is operable by the controller based on an output of the CANH error detector.

9. The circuit of claim 7, wherein the second switch is operable by the controller based on an output of the CANL error detector.

10. The circuit of claim 7, wherein the configurable voltage source further includes a comparator coupled with a reference voltage source.

11. There circuit of claim 10, wherein the configurable voltage source further includes a switch operable by the comparator.

12. There circuit of claim 11, wherein the first switch and the second switch are configured to bypass one or more of the plurality of resistors based on the control signal from the controller.

13. The circuit of claim 1, wherein the configurable voltage source is configured to be coupled with a terminal of the terminating end capacitor.

14. A method for generating a bias voltage for a terminating end capacitor in a controller area network (CAN) bus having a CANH wire and a CANL wire, the method comprising:
   detecting an error condition in the CAN bus;
   generating a bias voltage based on the error condition; and
   applying the bias voltage to a terminal of the terminating end capacitor.

15. The method of claim 14, wherein the error condition includes an intermittent open in the CANH wire.

16. The method of claim 14, wherein the error condition includes an intermittent open in the CANL wire.

17. The method of claim 14, wherein the detecting the error condition includes comparing a voltage across a resistor in a resistor divider connected to the CANH wire.

18. The method of claim 14, wherein the detecting the error condition includes comparing a voltage across a resistor in a resistor divider connected to the CANL wire.

19. The method of claim 14, wherein the generating includes receiving a control signal from a controller based on the detecting the error condition.

20. The method of claim 14, wherein the bias voltage is 1V or 4V depending on the error condition.

* * * * *